(12) United States Patent
Chastagnol et al.

(10) Patent No.: US 10,740,442 B2
(45) Date of Patent: Aug. 11, 2020

(54) BLOCKING OF UNLICENSED AUDIO CONTENT IN VIDEO FILES ON A VIDEO HOSTING WEBSITE

(71) Applicant: GOOGLE LLC, Mountain View, CA (US)

(72) Inventors: Franck Chastagnol, Palo Alto, CA (US); Vijay Karunamurthy, San Francisco, CA (US); Matthew Liu, Fremont, CA (US); Christopher Maxcy, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 786 days.

(21) Appl. No.: 15/214,118

(22) Filed: Jul. 19, 2016

(65) Prior Publication Data

US 2016/0328538 A1    Nov. 10, 2016

Related U.S. Application Data

(63) Continuation of application No. 14/031,931, filed on Sep. 19, 2013, now Pat. No. 9,424,402, which is a
(Continued)

(51) Int. Cl.
*G06F 21/10* (2013.01)
*G06F 16/64* (2019.01)
(Continued)

(52) U.S. Cl.
CPC .......... *G06F 21/105* (2013.01); *G06F 3/0482* (2013.01); *G06F 3/04842* (2013.01);
(Continued)

(58) Field of Classification Search
CPC ...... G06F 21/105; G06F 16/64; G06F 16/686; G06F 16/433; G06F 3/0482; G06F 16/7867
See application file for complete search history.

(56) References Cited

U.S. PATENT DOCUMENTS 5,634,012 A    5/1997 Stefik et al.
5,664,018 A    9/1997 Leighton
(Continued)

FOREIGN PATENT DOCUMENTS

GB    2369203 A    5/2002
GB    2397904 A    8/2004
(Continued)

OTHER PUBLICATIONS

Office Action for Canadian Patent Application No. CA 2,667,782, dated Nov. 6, 2016, 3 pages.
(Continued)

*Primary Examiner* — Irete F Ehichioya
*Assistant Examiner* — Huen Wong
(74) *Attorney, Agent, or Firm* — Young Basile Hanlon & MacFarlane, P.C.

(57) ABSTRACT

A system, method and various software tools enable a video hosting website to automatically identified unlicensed audio content in video files uploaded by users, and initiate a process by which the user can replace the unlicensed content with licensed audio content. An audio replacement tool is provided that enables the user to permanently mute the original, unlicensed audio content of a video file, or select a licensed audio file from a collection of licensed audio, and insert the selected in place of the original audio. Where a video file includes unlicensed audio, the video hosting website provides access to video files to a client device, along with an indication to the client device to mute the audio during playback of the video.

20 Claims, 4 Drawing Sheets

Related U.S. Application Data continuation of application No. 12/712,940, filed on Feb. 25, 2010, now Pat. No. 8,572,121, which is a continuation of application No. 11/674,638, filed on Feb. 13, 2007, now Pat. No. 7,707,224.

(60) Provisional application No. 60/856,501, filed on Nov. 3, 2006.

(51) Int. Cl.

| | | |
|---|---|---|
| *G06F 16/432* | (2019.01) | |
| *G06F 16/68* | (2019.01) | |
| *G06F 16/78* | (2019.01) | |
| *G06F 3/0482* | (2013.01) | |
| *G06F 16/00* | (2019.01) | |
| *G06Q 30/06* | (2012.01) | |
| *G06F 21/62* | (2013.01) | |
| *G06F 3/0484* | (2013.01) | |
| *H04N 21/8545* | (2011.01) | |
| *H04N 21/233* | (2011.01) | |
| *H04N 21/454* | (2011.01) | |

(52) U.S. Cl.
CPC ............ *G06F 16/00* (2019.01); *G06F 16/433* (2019.01); *G06F 16/64* (2019.01); *G06F 16/686* (2019.01); *G06F 16/7867* (2019.01); *G06F 21/6218* (2013.01); *G06Q 30/06* (2013.01); *H04N 21/233* (2013.01); *H04N 21/4542* (2013.01); *H04N 21/8545* (2013.01); *G06F 2221/0713* (2013.01); *Y10S 707/914* (2013.01); *Y10S 707/916* (2013.01); *Y10S 707/944* (2013.01)

(56) References Cited

U.S. PATENT DOCUMENTS

| | | |
|---|---|---|
| 5,787,471 A | 7/1998 | Inoue et al. |
| 5,892,536 A | 4/1999 | Logan et al. |
| 5,918,223 A | 6/1999 | Blum et al. |
| 5,924,116 A | 7/1999 | Aggarwal et al. |
| 6,091,822 A | 7/2000 | Mellows et al. |
| 6,222,807 B1 | 4/2001 | Min |
| 6,233,682 B1 | 5/2001 | Fritsch |
| 6,407,680 B1 | 6/2002 | Lai et al. |
| 6,473,778 B1* | 10/2002 | Gibbon ................. G06F 17/211 348/468 |
| 6,693,236 B1 | 2/2004 | Gould et al. |
| 6,810,388 B1 | 10/2004 | Sato |
| 6,871,200 B2 | 3/2005 | MacQueen et al. |
| 6,889,383 B1 | 5/2005 | Jarman |
| 6,898,799 B1 | 5/2005 | Jarman |
| 6,973,536 B1 | 12/2005 | Jacobs et al. |
| 6,976,165 B1 | 12/2005 | Carpentier et al. |
| 6,983,371 B1 | 1/2006 | Hurtado et al. |
| 7,020,635 B2 | 3/2006 | Hamilton et al. |
| 7,043,473 B1 | 5/2006 | Rassool et al. |
| 7,177,984 B1 | 2/2007 | Hervas |
| 7,366,787 B2 | 4/2008 | Salas et al. |
| 7,369,677 B2 | 5/2008 | Petrovic et al. |
| 7,370,017 B1 | 5/2008 | Lindeman et al. |
| 7,653,552 B2 | 1/2010 | Vaidyanathan et al. |
| 2001/0010756 A1* | 8/2001 | Ogino .............. G11B 20/00086 386/257 |
| 2001/0034714 A1 | 10/2001 | Terao et al. |
| 2002/0082731 A1 | 6/2002 | Pitman et al. |
| 2002/0082999 A1 | 6/2002 | Lee et al. |
| 2002/0165819 A1 | 11/2002 | McKnight et al. |
| 2003/0037010 A1* | 2/2003 | Schmelzer ............ G06F 21/10 705/67 |
| 2003/0061490 A1 | 3/2003 | Abajian |
| 2003/0095660 A1 | 5/2003 | Lee et al. |
| 2004/0003398 A1 | 1/2004 | Donian et al. |
| 2004/0010602 A1 | 1/2004 | Van et al. |
| 2004/0111628 A1 | 6/2004 | Inotani et al. |
| 2004/0163106 A1 | 8/2004 | Schrempp et al. |
| 2004/0221118 A1 | 11/2004 | Slater et al. |
| 2005/0060542 A1 | 3/2005 | Risan et al. |
| 2005/0071604 A1 | 3/2005 | Tanner et al. |
| 2005/0080846 A1 | 4/2005 | McCleskey et al. |
| 2005/0144141 A1 | 6/2005 | Nagao |
| 2005/0246752 A1 | 11/2005 | Liwerant et al. |
| 2006/0031870 A1 | 2/2006 | Jarman et al. |
| 2006/0034177 A1 | 2/2006 | Schrempp |
| 2006/0085816 A1 | 4/2006 | Funk et al. |
| 2006/0106725 A1 | 5/2006 | Finley et al. |
| 2006/0110137 A1 | 5/2006 | Tsuda et al. |
| 2006/0167881 A1 | 7/2006 | Aydar et al. |
| 2006/0177198 A1 | 8/2006 | Jarman et al. |
| 2006/0212927 A1 | 9/2006 | Riku et al. |
| 2007/0028308 A1 | 2/2007 | Nishio et al. |
| 2007/0058925 A1 | 3/2007 | Chiu |
| 2007/0101360 A1 | 5/2007 | Gutta et al. |
| 2007/0180537 A1 | 8/2007 | He et al. |
| 2007/0203911 A1 | 8/2007 | Chiu |
| 2007/0211174 A1 | 9/2007 | Putterman et al. |
| 2007/0220116 A1* | 9/2007 | Rose .................... H04L 67/104 709/219 |
| 2007/0282472 A1 | 12/2007 | Seldman |
| 2008/0052783 A1 | 2/2008 | Levy |
| 2008/0059426 A1 | 3/2008 | Brock et al. |
| 2008/0059461 A1 | 3/2008 | Brock et al. |
| 2008/0059536 A1 | 3/2008 | Brock et al. |
| 2008/0201747 A1* | 8/2008 | Cooper .................. G06F 21/10 725/93 |
| 2012/0054447 A1 | 3/2012 | Swart et al. |
| 2015/0220249 A1* | 8/2015 | Snibbe ................. G06F 3/0412 715/719 |

FOREIGN PATENT DOCUMENTS

| | | |
|---|---|---|
| JP | 2003-242281 | 8/2003 |
| WO | WO-2002/011033 A1 | 2/2002 |
| WO | WO-2002/103968 A1 | 12/2002 |
| WO | WO-2005/060424 A3 | 7/2005 |
| WO | WO-2006/007449 A3 | 1/2006 |
| WO | WO-2006/015168 A2 | 2/2006 |
| WO | WO-2006/077551 A3 | 7/2006 |

OTHER PUBLICATIONS

Combined Search and Examination Report, UK Patent Application No. GB0805603.8, dated Jul. 17, 2008, 4 pages.
Communication Pursuant to Article 94(3) EPC for European Patent Application No. EP 08737515.0, dated Mar. 5, 2013, 7 Pages.
Communication Pursuant to Article 94(3) EPC for European Patent Application No. EP 10187030.1, dated Apr. 24, 2013, 6 Pages.
Definition for "Publisher", The Penguin English Dictionary, London: Penguin, 2007, Credo Reference. Web. Jul. 31, 2010, 1 page, can be retrieved at <http://www.xreferplus.com/entry/penguineng/publisher>.
European Search Report for European Patent Application No. EP 08737515, dated Dec. 13, 2010, 6 Pages.
European Search Report for European Patent Application No. EP 10187030, dated Dec. 15, 2010, 6 Pages.
Final Office Action for U.S. Appl. No. 13/204,248, dated Oct. 30, 2012, 11 Pages.
First Office Action for Chinese Patent Application No. CN 200780046460.6, dated Apr. 13, 2012, 21 Pages.
International Search Report and Written Opinion for PCT/GB2013/053042, dated Feb. 17, 2014.
IT Media, Inc., "YouTube tied up with CBS, SONY BMG and UMG", ITmedia News, ITmedia Kabushikikaisha, Japan, Oct. 10, 2006, 3 pages, can be retrieved at <URL: http://www.itmedia.co.jp/news/articles/0610/10news063.html>.
Kishigami, J., et al., "Trend on Content Business," Report of Institute of Information Processing's Research, Institute of Information Processing, Nov. 19, 1999, pp. 37-42, vol. 99, No. 94 (With English Abstract).

(56) References Cited

OTHER PUBLICATIONS

Notice of Grounds for Rejection for Japanese Patent Application No. P2009-535496 dated Feb. 28, 2012, 13 Pages.
Office Action for U.S. Appl. No. 13/204,248, dated Mar. 2, 2012, 12 Pages.
PCT International Search Report and Written Opinion, PCT/IB2008/000997, dated Aug. 3, 2009, 7 pages.
PCT International Search Report and Written Opinion, PCT/US2007/083677, dated May 14, 2008, 7 pages.
Second Office Action for Chinese Patent Application No. CN 200780046460.6, dated Mar. 15, 2013, 6 Pages.

* cited by examiner

BLOCKING OF UNLICENSED AUDIO CONTENT IN VIDEO FILES ON A VIDEO HOSTING WEBSITE

CROSS REFERENCE TO RELATED APPLICATIONS

This application is a continuation of U.S. application Ser. No. 14/031,931 filed Sep. 19, 2013 which is a continuation of U.S. application Ser. No. 12/712,940 filed Feb. 25, 2010, which is a continuation of U.S. application Ser. No. 11/674,638 filed Feb. 13, 2007, which claims the benefit of U.S. Provisional Application Ser. No. 60/856,501 filed Nov. 3, 2006, each of which is incorporated by reference in its entirety.

TECHNICAL FIELD

The present invention relates generally to web-based video display and specifically to software tools and methods for managing audio and other content in an online content distribution system, in relationship to the content owner's copyrights.

BACKGROUND

The sharing of video content on websites has developed in a worldwide phenomenon, supported by dozens of websites. On average, over 100,000 videos are posted every day to various video hosting websites, and this number is increasing, as the tools and opportunities for capturing video become easy to use and more widespread. In some cases, the individuals who post videos are unaware that others may have rights in the video content, audio content, or both or a particular video. For example, it is relatively simple to find copies of music videos by well known artists, as well as homemade video that include audio soundtracks from copyrighted music works.

When a video is posted that contains audio content that is owned by a copyright holder such as music label or music publisher, or individual, that content owner has the right under current copyright law, particularly the Digital Millennium Copyright Act, to issue a "takedown" notice to the hosting website, requesting that it remove the identified video. Currently in the United States, the website must then remove the identified video and provide an opportunity for the user who posted the video to challenge the notice. The handling of takedown notices results in increased overhead in terms of mechanisms to handle the notices and user responses in order to ensure legal compliance. In addition, the removal of posted videos is disruptive of the overall user experience on the website.

SUMMARY OF INVENTION

Various systems, methods and software tools enable users who post videos on a video hosting website to manage the audio content of the videos, including replacing ("swapping") audio content of a video, permanently muting the audio content, or entirely removing the video file from the site. An audio replacement software tool is interoperative with the video hosting website to enable the user to replace unlicensed audio content, which would otherwise be subject to a takedown notice, for example, with either licensed audio content or license-free content. The video hosting website can thereby proactively avoid takedown notices from being issued, and thereby reduce the costs and complications associated with the compliance with the takedown notices. In addition, by enabling users to swap unlicensed content for licensed content, the site can establish revenue sharing arrangements with the content owners of the licensed content. The content owners benefit from increased distribution of their audio content, and in some cases receive appropriate compensation for its use.

Another aspect of the system is the integration of the audio replacement tool and system support with a rights claiming management system. The rights claiming management system includes a content identification system, which is adapted to process uploaded video content and identify whether the audio content thereof is owned by a third party, such as a music label or publisher. When the audio content is identified as belonging to a third party that has not licensed its use on the video hosting site, the user who uploaded the content is notified of a possible copyright infringement, and directed to use an audio editing tool provided by the video hosting website to manage the audio content of the file. The content owner may also be notified of the presence of the unlicensed content at this time or subsequently; a content claim record is created in a content claim database. This record can be used to track claims for content ownership and revenue sharing.

The video file with the unlicensed content can be managed at the video hosting site in a number of different ways. First, the video can be posted for general access, but with a file setting (e.g., a "mute flag") that indicates to a video player to mute the audio content during playback; in addition a message is displayed on the playback page (or in the player) indicating that the audio content is being blocked. This allows other users to know why the audio is not being played, instead of assuming that there is a problem with the player or their computer. Alternatively, the video content can be withheld from general access until the posting user corrects the problem with the unlicensed audio content.

As noted above, the audio replacement tool provides the user with the capability to replace the unlicensed audio content with licensed content, to remove the video from the site, or to permanently mute the audio content during playback. Where the user uses the replacement tool to select and replace the unlicensed content with licensed content, the existing unlicensed audio file is removed from the video file, and the selected licensed audio content is mapped to the video file. The claim record that indicated the presence of the unlicensed content, can be closed, and a new claim record instantiated to indicate that an instance of licensed content, along with an indicator of a revenue sharing policy that is associated with the audio content (alternatively, the existing claim record can simply be updated to show the current license status). Once the licensed content is associated with the video file, the mute flag can be removed, and licensed audio content played back with the video when needed; the associated blocking message is also removed.

The audio replacement tool may be configured by the video hosting site to be closed so that it can only access a restricted library of licensed content, or can be configured to be open, so that it can access any content available to the user via his computer (e.g., locally stored audio files). The former configuration is useful to ensure that only licensed content is used to replace unlicensed content, so that the content providers benefit from guaranteed use of their content (and potential revenue share). The latter configuration is useful to afford maximum flexibility and artist freedom to the posting users. The audio replacement tool can further be variably configured (e.g., open for some users, closed for others) depending on other criteria (e.g., payments, user status, promotions, etc.).

The audio replacement tool can be provided in a number of different ways. One embodiment provides the audio replacement tool as a browser-based tool (application) hosted by the video hosting website. Another embodiment provides the audio replacement tool as a standalone application executing on the user's computer, and preferably pre-configured to access the libraries of licensed content on the video hosting site.

In some of the described embodiments, the audio replacement tool is used in conjunction with the rights management system and the content identification system, following identification of unlicensed audio content therein when the user posts a video file. In another embodiment, the audio replacement tool can be used independently of the content identification system. Here, the user first uploads a video file (which may have either licensed audio content, unlicensed audio content, user created audio content, or no audio content) and accesses the audio replacement tool to add (or replace) audio content to the video file. The user can select an audio file from a library of licensed audio content. The selected audio file is then combined with the video file to produce a final video file. The final file is then posted for general access. The content owner of the selected audio file is provided with the appropriate revenue share for the use of the licensed content.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DESCRIPTION OF EMBODIMENTS

It is to be understood that the Figures and descriptions of the present invention have been simplified to illustrate elements that are relevant for a clear understanding of the present invention, while eliminating, for the purpose of clarity, many other elements found in typical communication system and method of using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Figure 1:
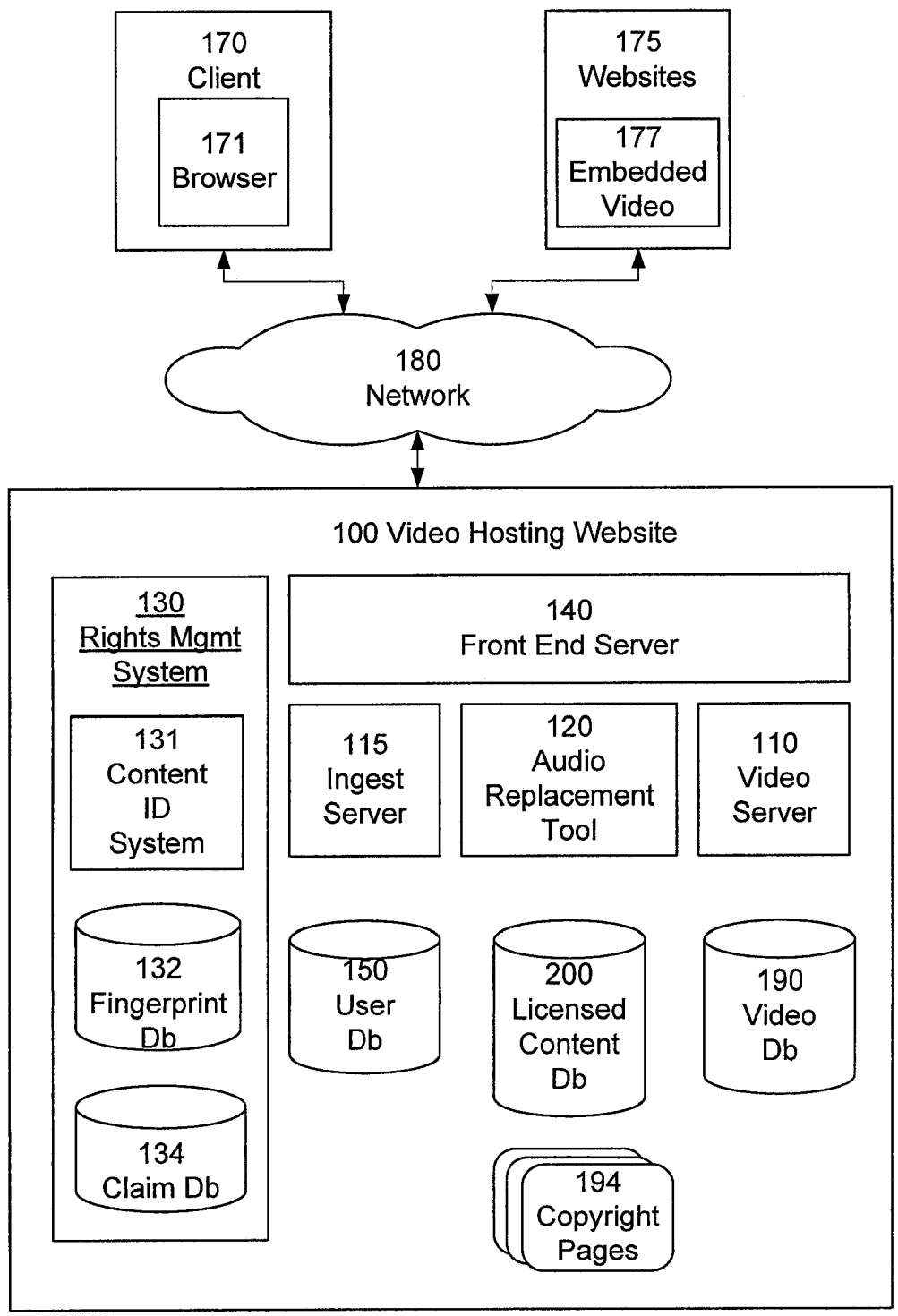
FIG. 1 is a block diagram of a system architecture for providing audio replacement for uploaded video content.

FIG. 1 is a block diagram of a system architecture in accordance with one embodiment of the present invention. As shown in FIG. 1, a video hosting website 100 includes a front end server 140, a rights management system 130, an audio replacement tool 120, a video server 110, an ingest server 115, and various databases, including a user database 150, a licensed content database 200, a video database 190. Many conventional features, such firewalls, load balancers, application servers, failover servers, site management tools, and so forth are not shown so as not obscure the features of the system. A suitable website 100 for implementation of the system is the YOUTUBE™ website, found at www.youtube.com; other video hosting site are known as well, and can be adapted to operate according the teaching disclosed herein. It will be understood that the term "web site" represents any method of uploading and downloading content and is not intended to be limited to content uploaded or downloaded via the Internet or the HTTP protocol. The various servers can be implemented as a single piece of software or hardware or as multiple pieces of software or hardware. In general, functions described in one embodiment as being performed on the server side can also be performed on the client side in other embodiments if appropriate. In addition, the functionality attributed to a particular component can be performed by different or multiple components operating together.

A client 170 executes a browser 171, and can connect to the front end server 140 via a network 180, which is typically the Internet, but may also be any network, including but not limited to a LAN, a MAN, a WAN, a mobile, wired or wireless network, a private network, or a virtual private network. While only a single client 170 and browser 171 are shown, it is understood that very large numbers (e.g., millions) of clients are supported and can be in communication with the website 100 at any time. The browser 171 include a video player (e.g., Flash™ from Adobe Systems, Inc.), or any other player adapted for the video file formats used in the site 100. A user can access a video from the site 100 by browsing a catalog of videos, conducting searches on keywords, reviewing playlists from other users or the system administrator (e.g., collections of videos forming channels), or viewing videos associated with particular user group (e.g., communities). A browser 171 can also access a video file indirectly, via an embedded video 177 that is accessed via an embedded hyperlink in a third party website 175.

Users of the clients 170 and browser 171 can upload content (which can include, for example, video, audio, or a combination of video and audio) to site 100 via network 180. The uploaded content is processed by an ingest server 115, which processes the video for storage in the video database 190. This processing can include format conversion, compression, metadata tagging, and other data processing. An uploaded content file is associated with the uploading user, and so the user's account record is updated in the user database 150 as needed.

For purposes of convenience and the description of one embodiment, the uploaded content will be referred to a "videos" or "video files", but no limitation on the types of content that can be uploaded are intended by this terminology. Each uploaded video is assigned a video identifier (id) when it is processed by the ingest server 115. The ingest server 115 communicates with the rights management system 130 to determine whether the uploaded video is subject to rights of content owners other than the user who uploaded the video.

The video database 190 is used to store the ingested videos. The licensed content database 200 stores encoded audio files and associated metadata, provided by their respective content owners. The audio files are can be encoded at .mp3 files at 64 kbps, mono, 22.1 KHz, or better quality (e.g., 128 kbps, stereo, 44.2 KHz). The metadata for each audio files includes an ISRC (or custom identifier), artist, song title, album, label, genre, time length, and optionally geo-restrictions that can be used for data collection or content blocking on a geographic basis.

The rights management system is one means for processing the video file to determine whether the audio content of the video file is an unauthorized use of a content owner's licensed content. In one embodiment, the rights management system 130 uses two types of identification processes to make this determination. First, the rights management system 130 generates a hash (e.g., MD5, SHA-n, etc.) of the video file itself, to produce a file signature. This signature (or hash code) is compared with an existing collection of file signature of known licensed content. In this embodiment, the licensed content would be audio files from music labels, publishes, independent artists, or the like. The file signature can correspond to any licensed content, including content that is available on the site 100 as well as content that is not available on the site, but only through other channels. This feature allows the system 130 to identify unlicensed audio content, regardless of its availability within the site 100. If the file signature matches the signature of a licensed content file, then is it is determined that audio content is unlicensed, and hence an infringement of the content owner's rights in the licensed content file. In this case, the content owner is determined for the licensed content, and the owner's policy for revenue sharing or block is retrieved from the claim database 134. If the policy is to block the content, then the video file is marked as restricted, and thus not enabled for general access in the video database 190; alternatively the file is not loaded into the database 190 and is discarded. If the policy indicates revenue sharing, then a claim record is established in the claim database 134, indicating the particular video ID content, content owner, and policy. A subsequent accounting process is run periodically to allocate revenue to the content owner for the use of the audio content. The parameters for allocation of revenue are stored in association with the content owner's policy record in the licensed content database 200.

If there is no match for the file signature, and the second level of identification is provided by the content identification system 131. The content identification system 131 employs an audio fingerprint on the audio portion of the video file. The audio fingerprint is based on analysis of spectral content of the audio file (e.g., frequency, amplitude, phase, etc.). A suitable content identification system for processing audio fingerprints is available from Audible Magic Corporation, of Los Gatos, Calif. A fingerprint database 132 is maintained that contains the fingerprints of licensed content from known content providers. The fingerprint database 132 can contain fingerprints provided by directly by the content owners, generated by the provider of the content identification, or generated internally by the video hosting website 100 using the appropriate analysis tools. The fingerprints in the database 132 can correspond to any licensed content, including content that is available on the site 100 as well as content that is not available on the site, but only through other channels. This feature allows the content identification system 131 to identify unlicensed audio content, regardless of its availability within the site 100. A more detailed description of the file signature and fingerprint matching process is described in the above referenced related application.

If the fingerprint of the audio content of the video file does not match a known fingerprint, then is determined that the audio content is not an unauthorized copy of a licensed content. The video file is then enabled in the video database 190 for general access by browsers. The video server 110 can access the stored file and provide it to a requesting browser. If the fingerprint of the audio content of the video file does match a known fingerprint, then the automatic audio replacement process is initiated.

Figure 2:
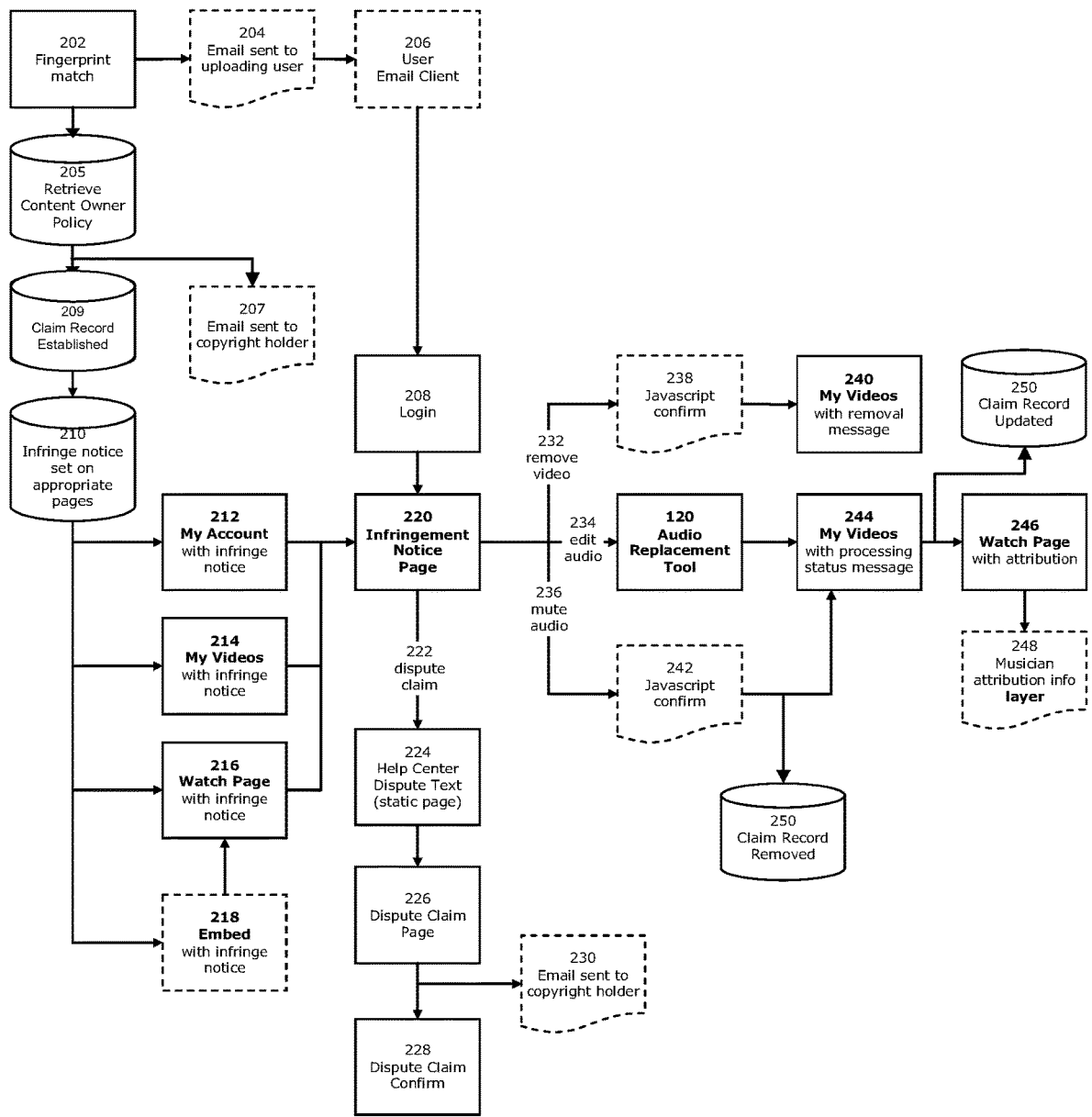
FIG. 2 is a process flow for an automatic takedown process.

FIG. 2 illustrates one embodiment of the automatic audio replacement process, which can be executed by the rights management system 130, or both other software components, as desired by the system administrator. For the purposes of this explanation, FIG. 2 begins in response to the positive identification 202 of either a file signature or the audio fingerprint. Having identified the licensed content from the file signature or fingerprint, the rights management system 130 has information that identifies the owner of the content, and so retrieves 205 the owner's policy information for handling instances of unlicensed content. Generally, the policy will indicate whether to block the audio file from playback entirely, or allow a revenue share for the audio content. Optionally, the content owner can also be notified 207, for example, by an email; alternatively, the content owner can be notified in a batch process, either periodically (e.g., once daily, weekly, monthly), or after a preset number of matching fingerprints (e.g., each 100 matches), or the content owner can be given access to the claim database 134 by which they can inspect and determine which content has been identified for claims.

If the policy for the content owner is indicated to be revenue sharing, then the video file and its audio is allowed to be posted and accessed without restriction. A claim record is established 209 in the claim database 134, indicating the particular audio content, content owner, and policy.

Where the content owner's policy is to block the audio content, then a different set of operations is engaged to create an automatic takedown of the identified audio content. An email is automatically generated and sent 204 to the uploading user, identifying the uploaded file, the identified audio content (e.g., song name, artist, date, publisher, etc.) and informing the user that the uploaded content has been found to match a known work of licensed content, and that it infringes the content owner's copyright in such content. The email instructs the user to login to the site 100 and correct the problem through various alternative options. The user is given a period of time (e.g., 15 days or even 0 days) by which to take action to correct the problem. (The number of days for action can be varied, depending on considerations such as follow of identification, user feedback, or the like). The email also includes links to various copyright information pages 194 (FIG. 1), which further explains the issues pertaining to copyright law and the unauthorized use and distribution of audio content. The user accesses this email through an email client 206. The rights management system 130 also sets a flag in the user's account that there is an outstanding block on an uploaded video file. If the does not undertake one of the editing action (mute audio, replace audio, remove file) within a predetermined amount of time (e.g., 10 days), then video file is retrieved from the database 190, the audio content is automatically removed from the video file, and the modified video file is stored back to the database 190. The mute flag can then be removed since the video will now play without any audio at all; this approach is beneficial to prevent a malicious user from removing the mute flag or modifying a video play to ignore it. Alternatively, instead of providing the user a limited amount of time to act, the audio file is immediately removed, and the user is notified and offered the option to replace the audio as described below.

Figure 4:
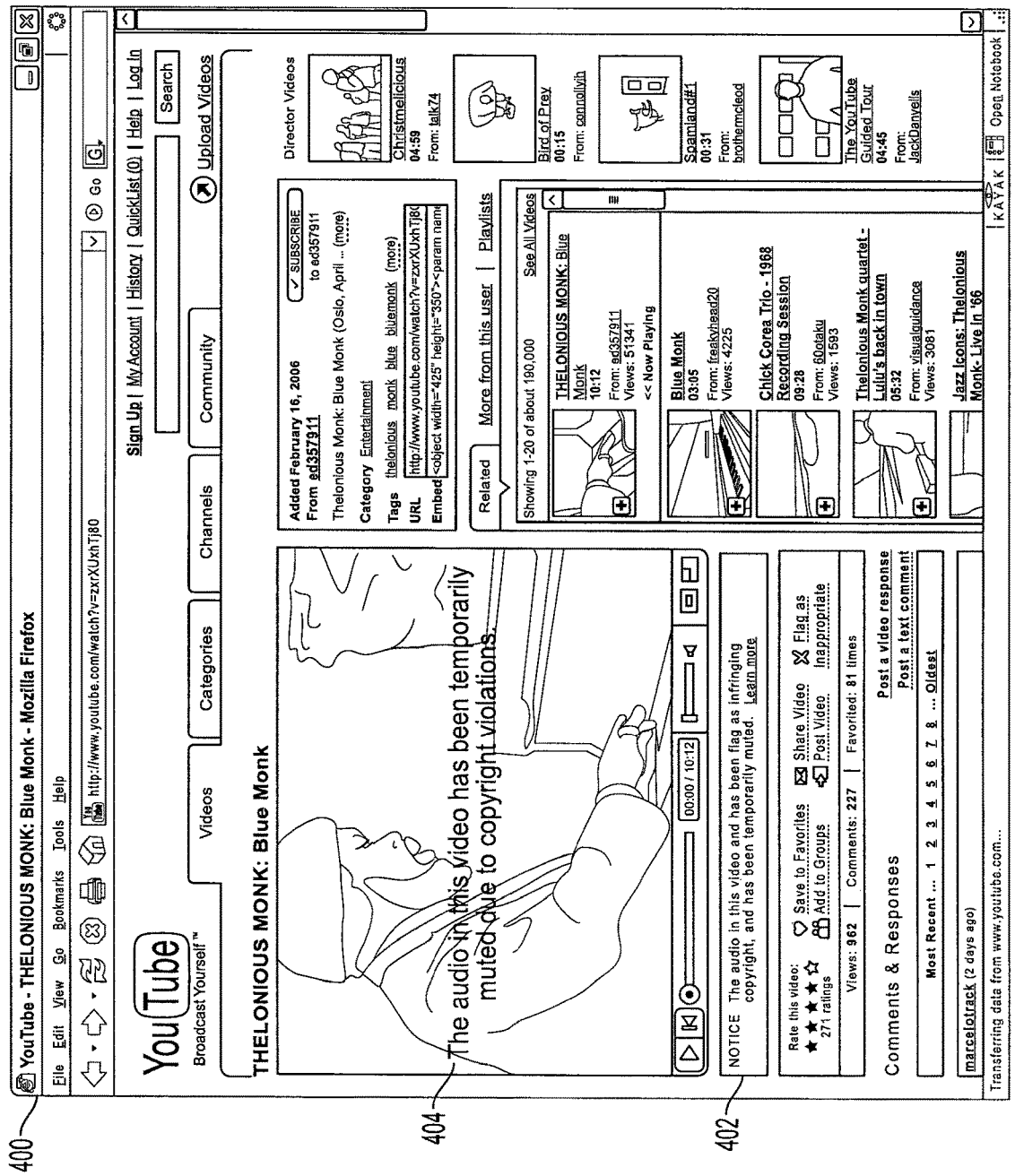
FIG. 4 is an illustration of a web page showing the messaging associated provided with the audio content of a video file is blocked.

In one embodiment, an infringe notice 210 is set on the appropriate pages. In addition, the video file is updated in the video database 190 with the mute flag (or other suitable signal) set to indicate to a compatible video player to mute the audio upon playback. When a user accesses the video, the page 216 for that video includes a message that indicates that the audio is muted due to it being an unauthorized use of the content. FIG. 4 illustrates an example page 400 with such a message 402. The message can also appear in the video playback area 404 as video, text or graphics, in conjunction with (e.g., prior to or during) the playback of the video. Optionally, an audio notification file with a recorded message indicating that audio content of the video has been muted, can be played during (or before) the video file is played; this feature is particularly beneficial for video files that are embedded in third party pages. When a user (any user) makes a request for the video file, the video server 110 begins streaming the video file to the user's browser 171 (which executes a video player). The video player detects the mute flag, and thus mutes the audio while playing back the video file. Another alternative approach is to process the audio content either before or during playback to render it no longer recognizable, for example by scrambling, garbling, or otherwise distorting the audio content; this can be done either through manipulate of the encoded audio data packets, or through processing of the audio content in the frequency domain. An appropriate message 402 can likewise be provided in this instance to alert the viewer. Another alternative approach is to replace the unlicensed audio with a computer generated melody that matches a musical characteristic of the audio content, such as its tempo (but preferably does not use samples, voices, or pitches). This replacement is done generally after the unlicensed audio content has been detected, and prior to the video being edited by the uploading user. This provides the viewing user with a limited audio experience without resulting in an impermissible use of the licensed audio content.

As indicated above, in some instances a video file is embedded in a page on a third party website, and plays in that page, via a hyperlink to the file. In these cases, since the video is playing in the third party page, the message that is otherwise present on the host site 100 indicating that the audio is being blocked and would not be available. Accordingly, for these embedded video files, in one embodiment, the entire video is blocked from playback; alternatively a video file containing a message can be played first indicating that the audio portion of the file is being muted, or with the audio notification mentioned above. In an alternative embodiment, the infringe notice is embedded 218 in the page on the third party website.

The user who uploaded the video file subsequently logs in 208 to the video hosting website 100. Upon login the site 100 checks the user's account, and determines that there is outstanding block on the upload. The site thus loads for the user the copyright infringement notice page 220 which describes to the options for resolving the blocked audio content. The user can dispute 222 the claim that the content is unauthorized (i.e., infringes the content owner's copyright in the audio), in which case the user is taken through a series of pages 224, 226 describing the dispute process in which the user can file a counter-notification under the DMCA. The user is required to confirm that he has read and accepted the information on each page, in order to reduce the number of instances of false disputes.

If the user decided to proceed to a dispute, the user is presented with an online form in which he must input the following information:

- a physical or electronic signature of the subscriber (e.g., typing the user's full name into a signature box);
- identification of the audio content that has been removed or to which access has been disabled and the location at which the content appeared before it was removed or access to it was disabled; this is the video ID of the video;
- a statement under penalty of perjury that the user has a good faith belief that the audio content was removed or disabled as a result of mistake or misidentification of the material to be removed or disabled; here is checkbox is provided for the user to check indicating acknowledgement of the statement;
- The user's name, address, and telephone number, and a statement that the user consents to the jurisdiction of Federal District Court for the judicial district in which the address is located, or if the user's address is outside of the United States, for any judicial district in which the service provider may be found, and that the user will accept service of process from the person who provided notification or an agent of such person; here the user enters their personal information.

Once the user submits the above information in the counter-notification form, the site 100 checks that the video ID input by the user corresponds to a video owned by the user. The site 100 also checks that the video ID has not been filed in previous counter-notification, thereby avoiding duplicate claims. The site 100 further checks that content owner of the audio content for the video ID has a policy which blocks the use of the content. If all of these checks are passed, then a confirmation page 228 is presented to the user to confirm that the counter-notification has been made. If any of these last checks fail, the user is provided with an appropriate error message.

Once a counter-notification is filed, the site 100 marks the user's video to withhold it from general access and playback for predetermined period of time (e.g., 15 days). An email is then sent 230 to the content owner which includes the information in the counter-notification (and/or the completed counter-notification form itself), so that the content owner is informed that the user is disputing the content owner's claim of infringement; the content owner is given the predetermined period of time in which in which take further action under the DMCA, and send notification of such action to the site 100. If the content owner fails to act with the prescribed time period, then the counter-notification is considered valid, the video is released from its hold, and can be accessed without restriction. The site 100 sends an email to the user in this instance advising him that the video has been released. If the content owner takes legal action, then the user is likewise notified by an email from the site 100. In this circumstance, the site 100 removes the video from the system to prevent its further playback.

In most cases, the user will not proceed to a counter-notification, and instead will act to edit the video. The user has several different editing actions that they can apply to the video file, including removing 232 the video file so that it is no longer available, muting 236 the audio content, or editing 234 the audio content to select a licensed audio content for the file. Should the user decide to remove 232 the audio content, a confirmation page 238 is provided to the user; after confirmation, the video is removed from the video database 190. The user is directed to their "My Videos" page 240, which contains a listing of their posted video. A message is presented on this page 240 indicating that the posted video has been removed.

Should the user decide to mute 236 the audio content, another confirmation page 242 is presented to confirm the user's decision. The website 100 invokes a utility tool which then removes the unlicensed audio content from the video file, which has the same effect as permanently muting the audio. This action is irreversible. Alternatively, the unlicensed audio content can be left in the video file, with the audio mute flag set to mute the audio playback. The user is directed 244 to their My Videos page, and a message is provided there stated that the audio content for the video has been permanently blocked. In one embodiment, the user can later use the audio replacement tool 120 to insert licensed audio content into the video file.

Figure 3:
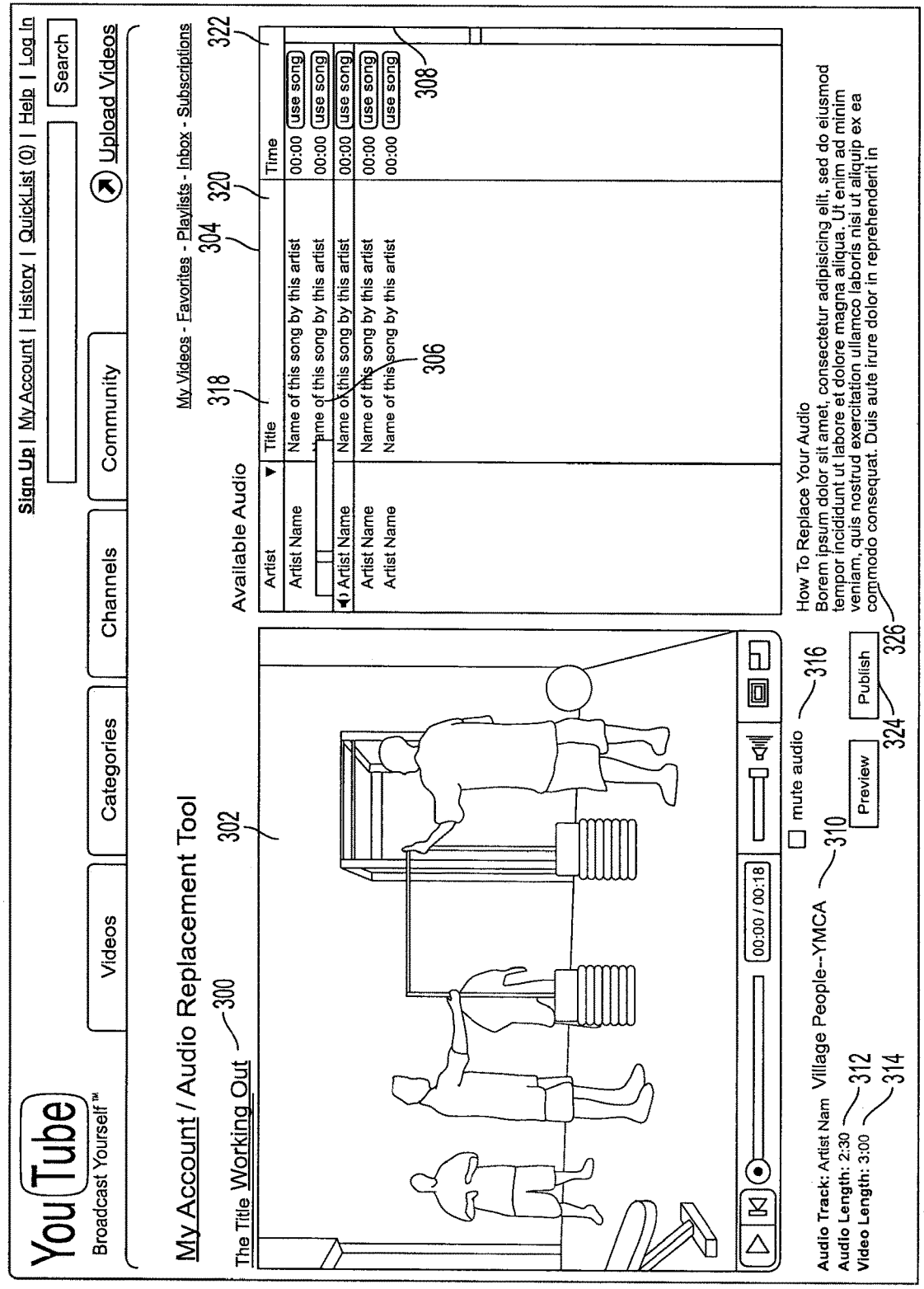
FIG. 3 is an illustration of the audio replacement tool.

Should the user decide to edit 234 the audio content, the audio replacement tool 120 is loaded (for example, as part of the Javascript of a page) or invoked (as standalone application or browser plugin) depending on the implementation. The audio replacement tool 120 is one means for enabling the user to replace the audio content of a video with audio content from other sources including a library of licensed audio content. Referring to FIG. 3 there is shown one embodiment of an audio replacement tool 120 as it would appear to the user. The audio replacement tool 120 includes a video display window 302, which is one means by which the user can view the video (below the video display area 302 are playback control, a timer, a volume control, and size controls). The user provided title 300 of the video is indicated above the video display window 302. Also listed below the video display window 302 is the name 310 of the identified, unlicensed audio content, its length 312, and the length 314 of the user's video. To the right thereof is a control 316 for permanently muting the audio, should the user decide at this time to mute the audio; selection of this option is one means that operates to remove the unlicensed audio content from the video file, as described above. On the right side of the tool 120 there is shown a listing 304 of available licensed audio content, and is one example of a means by which the user can select a file to replace the unlicensed audio content; the listing 304 will generally include licensed content that is available from the licensed content database 200. The listing may also include a list of freely available audio, such as audio in the public domain or available through a Creative Commons license or other open or free license; this option is beneficial to artists who are seeking further exposure to their music. The listing 304 includes the name 318 of the artist, the title 320 of the audio content, and its length 322. Also provided is audio preview control 306 that allows the user to playback a portion (or all) of the selected file; this feature allows the user to hear the selected content and decide if it is appropriate for their video. A control button 308, "Use Song" is provided by which the user selects which audio content to use for replacement.

The illustrated embodiment of the audio replacement tool 120 in FIG. 3 is only one example of the audio replacement tool 120. In another embodiment, the content listing 304 includes a search tool, which is one means for searching for audio content by artist name, song name, album name, year, or genre. In addition, the listing 304 can be made part of a category browser, which is one means that allows the user to browse a library of audio content by any of the foregoing attributes.

When the user selects a particular licensed audio file for replacement, that audio content is mapped to the video file for playback. It should be noted that the user is only allowed to select audio for playback with (and only with) the video file as the video is played back in a streaming manner; the user cannot select licensed audio content for playback without any video, nor can the user enable the audio content to be independently downloaded by other users at a later time. The user can preview the edited video file, with the selected audio, to determine if it acceptable, via the preview button 324. This causes the video portion of the user's video to be played back in conjunction with the selected audio content; the original audio content that was part of the video file is muted.

If the selected audio content is acceptable to the user, the user then publishes the completed video file via the publish button 326. The original audio content of the file is then stripped, and the selected audio is stored into the video file, as required for the file format. In one embodiment, the file is "flattened" into a single Flash FLU file in which the video and audio are merged. Depending on the configuration of the audio replacement tool 120, this can be done either internally by appropriate video and audio encoder in the audio replacement tool 120, or by providing to the video hosting site 100 an identifier of the selected audio content, which is then processed in conjunction with the video file by the appropriate video and audio encoder at the site 100; either mechanism provides a suitable means for replacing the unlicensed audio content with selected audio content. The updated video file is then stored back to the video database 190. Playback of the edited video file appears like other video content in the database 190.

The audio replacement tool 120 can be configured to provide various levels of user control as to the mapping. The audio replacement tool 120 can be configured to simply map the audio content to the video file from the beginning thereof, so that both the audio and video portions have the same starting point. If the audio file is shorter in duration then the video file (e.g., the audio is 2:00 minutes and the video is 3:00 minutes), then when the audio file is ended, the remainder of the video is silent. If the audio file is longer than the video file, then the audio file is truncated to the same length of as the video file. Alternatively the audio replacement tool 120 can be configured to offset the start the audio file to any point in the video file. In one embodiment, no further audio editing tools are provided to the user. This restriction is beneficial to the content owners as it ensures the integrity of the audio file.

In another embodiment, one or more various editing tools and effects can be provided to the user in the audio replacement tool 120. First, the audio replacement tool 120 can include a loop setting, by which the audio file can be set to loop for the duration of the video file. Other audio editing tools or effects can be provided as well, such as equalization controls, volume control, pitch change, reverb, limiters, and the like.

Another aspect of this embodiment is to only allow a limited, predetermined number licensed audio files to be inserted into a video file, regardless of the length of the video file. In one embodiment, the audio replacement tool 120 is restricted to allow only a single audio file to be inserted. This feature is beneficial to the content owners so as to ease the administration of the revenue sharing payments that come from the playback of the video. Accordingly, in an embodiment allowing only a single audio file, the audio replacement tool 120 is configured so that if the user first selects one audio file from the listing 304, and then selects a second file, the first file is removed (i.e., not used) and the second file is used instead. In addition, the audio replacement tool 120 is configured so that the user cannot save or download a licensed audio content to their local client 170. This prevents the user from obtaining an unauthorized copy of the audio content. The audio replacement tool 120 may be configured by the video hosting site 100 to be closed so that it can only access the audio content in the licensed content 200, which then appears in listing 304. Alternatively, the audio replacement tool 120 can be configured to be open, so that it can access any content available to the user via his computer (e.g., locally stored audio files). In this embodiment, the audio replacement tool 120 is configured to allow users to replace or mix the licensed audio in the video with the audio of any other videos that any other user has uploaded to the site. The audio replacement tool 120 can be further configured to allow users to dynamically choose between multiple audio tracks when playing back the same video, for example French or Spanish versions of the same movie clip, or playing back a politician's speech with a comedic audio track. Finally, the audio replacement tool 120 can further be configured to allow the user to record audio "comments" or karaoke by means of a microphone attached to their client device and appropriate sound card.

Referring again to FIG. 2, after the user has removed the video file or muted the audio the rights management system 130 updates 250 the claims database 134. This can be done by removing the previous claim record, or updating the claim record to indicate the user's action, and thereby provide an audit trail. Where the user has selected to use licensed content, a new claim record is instantiated, indicating the content owner, the licensed content and the revenue share policy flag.

Once the user has included the licensed audio content in the video file with the audio replacement tool 120, they are directed back to a video playback page 246 for watching the video file. This page is updated to include attribution information for the artist of the audio content, including the artist's name, album, song name, and song information. Additionally, hyperlinks are provided on the page to a music commerce site where the user can purchase the audio content for separate downloads. This video playback page 246 and its information and links are displayed to any user who accesses the video file, not just the user who uploaded it.

The above described process of detecting unlicensed audio content is invoked when a user uploads a video file. A similar process of identification of unlicensed audio can be engaged for videos that are already uploaded into the video database 190. Here, a selection of videos that are in the video database 190 are processed by the content identification system 131 for fingerprint matches to licensed audio content. Video files that having a matching fingerprint at flagged and the process described for FIG. 2 is initiated. For these existing video, there may be legacy information, such as comments, view counts, ratings, tags, and other information associated with the video. This legacy information is maintained when the video is either muted or it has its audio content replaced.

The audio replacement tool 120 can be configured as well for use any time a user uploads a video file and would like to add licensed audio content to it directly, instead of using whatever audio content is in the video file, whether their own audio content or other licensed content. In this embodiment, after the user uploads a video file, he can invoke the audio replacement tool 120, and then select a licensed audio content for inclusion in the video file. This selected audio file can be used to replace any existing audio for the video file, or mixed in with it as an overdub. For example, the user can replace an existing licensed audio content with other licensed audio content. As before, a new claim record is then created in the claim database 134, so that the content owner of the licensed audio content receives the appropriate revenue share from its use. As a further extension of this embodiment, the audio replacement tool 120 can be configured to be open, so that the user can also select from audio tracks available on their computer or other network locations. In this configuration, the selected audio file is processed by the content identification system 131 to determine if it is licensed content. If the audio file is determined to be licensed content, then the owner of the licensed content is identified from the fingerprint information, and the revenue sharing policy is determined. Where the policy indicates that the content owner allows for revenue sharing, then the audio content is included in the user's video. If the policy indicates that the content should be blocked, then the user is immediately notified that they cannot use the selected content, and given the option to select other content.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer system for managing the playback of videos stored on a video hosting server, the computer system comprising:
   at least one processor; and
   a non-transitory computer readable storage medium storing executable code, wherein the code when executed by the at least one processor causes the at least one processor to, responsive to an uploading of a video from a client device to the video hosting server, create a graphical user interface for output to a display of the client device, the graphical user interface comprising:
      an audio replacement tool user interface comprising:
         a video display window that displays the video, the video including video content and unlicensed audio content that is owned by a copyright holder other than a user that causes the uploading of the video to the video hosting server; and
      a licensed audio content list including:
         a list of selectable licensed audio files, each selectable licensed audio file licensed for use on the video hosting server; and
         a selection mechanism for the user to select a selectable licensed audio file from the list of selectable licensed audio files to replace the unlicensed audio content included in the video,
      wherein, responsive to a selection of the selected licensed audio file by the user using the selection mechanism of the audio replacement tool interface, the code when executed by the at least one processor causes the at least one processor to:
   replace the unlicensed audio content within the video with audio content of the selected licensed audio file based on a starting time of the unlicensed audio content within the video.

2. The computer system of claim 1, wherein the licensed audio content list further includes a search tool that receives a query for a selectable licensed audio file to replace the unlicensed audio content.

3. The computer system of claim 2, wherein the query comprise at least one of an artist name, a song name, an album name, or a music genre.

4. The computer system of claim 1, wherein the licensed audio content list further includes for each selectable licensed audio file a name of an artist associated with the selectable licensed audio file and a name of the selectable licensed audio file.

5. The computer system of claim 1, wherein the audio replacement tool user interface further comprises a title of the video displayed in the video display window.

6. The computer system of claim 1, wherein the audio replacement tool user interface further comprises a name of the unlicensed audio content included in the video displayed in the video display window.

7. The computer system of claim 6, wherein the audio replacement tool further comprises a length of the unlicensed audio content and a length of the video displayed in the video display window.

8. The computer system of claim 1, wherein the audio replacement tool user interface further comprises a control that causes the computer system to mute the unlicensed audio content included in the video displayed in the video display window responsive to receiving a selection of the control.

9. The computer system of claim 1, wherein the audio replacement tool user interface further comprises a preview control that causes the computer system to display the video with the audio content of the selected licensed audio file in the video display window.

10. The computer system of claim 1, wherein the audio replacement tool user interface further comprises a control to, responsive to the replacement of the unlicensed audio content with the audio content of the selected licensed audio file, publish the video with the audio content of the selected licensed audio file on the video hosting server.

11. A computer-implemented method for managing the playback of videos stored on a video hosting server, the computer-implemented method comprising:
   responsive to an uploading of a video including video content and unlicensed audio content from a client device, providing, for output to a display of the client device, a graphical user interface including an audio replacement tool user interface, the audio replacement tool user interface comprising:
      a video display window that displays the video, wherein the unlicensed audio content included in the video is owned by a copyright holder other than a user that causes the uploading of the video to the video hosting server; and a licensed audio content list including:
  a list of selectable licensed audio files, each selectable licensed audio file licensed for use on the video hosting server; and
  a selection mechanism for the user to select a selectable licensed audio file from the list of selectable licensed audio files to replace the unlicensed audio content included in the video;

receiving, from the user of the client device using the selection mechanism of the audio replacement tool, a selection of a selected licensed audio file from the list of selectable licensed audio files to replace the unlicensed audio content;

replacing the unlicensed audio content included in the video with audio content of the selected licensed audio file responsive to receiving the selection of the selected licensed audio file from the user of the client device; and responsive to the replacing of the unlicensed audio content with the audio content of the selected licensed audio file, publishing the video including the audio content of the selected licensed audio file on the video hosting server.

12. The computer-implemented method of claim 11, further comprising:
  notifying the user that causes the uploading of the video to the video hosting server of the unlicensed audio content included in the video.

13. The computer-implemented method of claim 11, wherein the audio replacement tool user interface further comprises a preview control and the method further comprising:
  responsive to receiving a selection of the preview control, providing a preview of the video with the audio content of the selected licensed audio file.

14. A computer program product comprising a non-transitory computer-readable storage medium having computer executable code for managing the playback of videos stored on a video hosting server, the code comprising:
  a graphical user interface for output to a display of a client device responsive to an uploading of a video including video content and unlicensed audio content from the client device to the video hosting server, the graphical user interface including an audio replacement tool user interface comprising:
    a video display window that displays the video, wherein the unlicensed audio content included in the video is owned by a copyright holder other than a user that causes the uploading of the video to the video hosting server; and
    a licensed audio content list including:
      a list of selectable licensed audio files, each selectable licensed audio file licensed for use on the video hosting server; and
      a selection mechanism for the user to select a selectable licensed audio file from the list of selectable licensed audio files to replace the unlicensed audio content included in the video,
    wherein, responsive to a selection of the selected licensed audio file by the user using the selection mechanism of the audio replacement tool interface, the code, when executed, causes a replacement of the unlicensed audio content within the video with audio content of the selected licensed audio file.

15. The computer program product of claim 14, wherein the licensed audio content list further includes a search tool that receives a query for a selectable licensed audio file to replace the unlicensed audio content.

16. The computer program product of claim 15, wherein the query comprise at least one of an artist name, a song name, an album name, or a music genre.

17. The computer program product of claim 14, wherein the licensed audio content list further includes for each selectable licensed audio file a name of an artist associated with the selectable licensed audio file and a name of the selectable licensed audio file.

18. The computer program product of claim 14, wherein the audio replacement tool user interface further comprises a control that causes the computer system to mute the unlicensed audio content included in the video displayed in the video display window responsive to receiving a selection of the control.

19. The computer program product of claim 14, wherein the audio replacement tool user interface further comprises a preview control that causes the computer system to display the video with the audio of selected licensed audio file in the video display window.

20. The computer program product of claim 14, wherein the audio replacement tool user interface further comprises a control to publish the video with the audio content of the selected licensed audio file on the video hosting server.

* * * * *